United States Patent [19]

Tani et al.

[11] Patent Number: 4,921,760

[45] Date of Patent: May 1, 1990

[54] ANTI-REFLECTION COATING OF OPTICAL PART MADE OF SYNTHETIC RESIN

[75] Inventors: Hakuzo Tani, Takatsuki; Masaru Okumura, Osaka, both of Japan

[73] Assignee: Minolta Camera Kabushiki Kaisha, Osaka, Japan

[21] Appl. No.: 100,953

[22] Filed: Sep. 25, 1987

[30] Foreign Application Priority Data

Sep. 26, 1986 [JP] Japan ................................ 61-228684
Sep. 26, 1986 [JP] Japan ................................ 61-228683
Sep. 26, 1986 [JP] Japan ................................ 61-228682

[51] Int. Cl.$^5$ ..................... B32B 27/06; G02B 1/10
[52] U.S. Cl. .................................. 428/446; 428/698; 428/701
[58] Field of Search ............... 428/446, 701, 698, 699, 428/432, 428, 429, 448

[56] References Cited

U.S. PATENT DOCUMENTS

| | | | |
|---|---|---|---|
| 3,901,997 | 8/1975 | Groth | 428/428 |
| 3,985,425 | 10/1976 | Clapp | 350/171 X |
| 4,018,519 | 4/1977 | Clapp | 352/89 |
| 4,173,778 | 11/1979 | Snavely et al. | 362/297 |
| 4,196,246 | 4/1980 | Takayama et al. | 428/213 |
| 4,228,446 | 10/1980 | Hiamer | 357/31 |
| 4,363,852 | 12/1982 | Nakajima et al. | 428/701 X |
| 4,556,599 | 12/1985 | Sato et al. | 428/701 X |
| 4,569,881 | 2/1986 | Freese et al. | 428/213 |
| 4,628,005 | 12/1986 | Ito et al. | 428/701 X |
| 4,640,867 | 2/1987 | Oyama et al. | 428/701 X |
| 4,719,146 | 1/1988 | Hohage et al. | 428/412 X |
| 4,735,488 | 5/1988 | Rancourt et al. | 350/164 X |

FOREIGN PATENT DOCUMENTS 3121801 5/1988 Japan .

*Primary Examiner*—Nancy A. B. Swisher
*Attorney, Agent, or Firm*—Price, Gess & Ubell

[57] ABSTRACT

An anti-reflection coating with n layers on an optical part substrate made of synthetic resin wherein n is 3, 4, or 5, and the first layer at the air side comprises silicon dioxide ($SiO_2$), and the n-th layer on the surface of the synthetic resin comprises ceric oxide ($CeO_2$) is excellent in reflection reducing effect and does not result in the age-based change of the refractive index. And that the very good adhesion of the reflection reducing coating with the substrate results in hardness of layer stripping.

Further an anti-reflection coating of the invention has reflection reducing effect in the near-infrared region.

5 Claims, 11 Drawing Sheets

ANTI-REFLECTION COATING OF OPTICAL PART MADE OF SYNTHETIC RESIN

BACKGROUND OF THE INVENTION

This invention relates to an anti-reflection coating that is excellent in adhesion to an optical part made of synthetic resin. Reflection reducing effects are generally achieved by laminating plural layers of materials having different refractive indices.

There are many prior art reference referring to an anti-reflection coating which provides an intermediate layer made of silicon dioxide or silicon monoxide between a substrate and an anti-reflection coating (for instance Japanese Patent Application KOKAI Nos. 101901/1980, 130701/1985, 130702/1985, 130703/1985, 130704/1985 and 131501/1985).

One reason for providing such an intermediate layer made of silicon dioxide is to overcome the defect that a surface of an optical part made of synthetic resin is vulnerable to mechanical scratching and solvents such as chemicals so as to improve the surface hardness and durability.

The silicon dioxide layer has nearly an equal refractive index to that of the optical part made of synthetic resin, so the layer does not play a role in the reflection reducing effect but works as an intermediate layer that improves the adhesion of the optical part with the reflection reducing layer. Further the intermediate layer requires thickness of more than some specified degree and the required thickness results in the deterioration of the efficiency of reflection reducing effects and creates a difficulty in maintaining the surface profile.

While, a silicon monoxide layer is utilized in a similar way as the silicon dioxide because of its good adhesion with an optical part made of synthetic resin. The silicon monoxide layer, although, provides the problem that the reflectivity properties are unstable.

From above reasons, materials for reflecting reducing coatings that have reflection reducing effects in themselves, excellent adhesivity with optical parts made of synthetic resin and stability against age-based changes are desired.

Japanese Patent Application KOKAI No. 101901/1980 discloses that an anti-reflection layer is coated on a glass layer (about $2\mu \sim 3\mu$ in thickness) of silicon monoxide (SiO) or silicon dioxide ($SiO_2$) formed on a synthetic resin substrate. The glass layer needs some specified thickness, which results in difficulty in controlling the thickness in the case of the glass layer formed by, for example, a dipping method and difficulty in maintaining the surface profile irregularity of optical parts and the layer causes the lack in the stability of reflectivity.

Japanese Patent Application KOKAI No. 130701/1985, 130702/1985, 130703/1985, 130704/1985, and 131501/1985 disclose an anti-reflection coating consisting of a silicon monoxide layer and silicon dioxide layer on a synthetic resin substrate. But the anti-reflection coating causes lack in the stability of reflectivity because the refractive index of the silicon monoxide layer changes with the passage of time.

SUMMARY OF THE INVENTION

An anti-reflection coating which includes a silicon monoxide layer or silicon dioxide layer on a synthetic resin substrate shows an unstable surface reflectivity (which results from silicon monoxide) and has a difficulty in maintaining the surface profile irregularity which results from the necessity of the specified thickness of silicon dioxide.

The objects of the invention are to solve the above defects of conventional anti-reflection coatings, and to provide an anti-reflection coating excellent in adhesion which does not undergo a change of the reflectivity with the passage of time. These objects are achieved by applying a ceric oxide which can adhere firmly to synthetic resin such as acrylic resin even in a thin layer.

BRIEF DESCRIPTION OF THE DRAWING

From FIG. 1 to FIG. 21 show reflectivity properties of anti-reflection coatings according to the first to twenty-first embodiments of the invention.

DETAILED DESCRIPTION OF THE INVENTION

The present invention relates to an anti-reflection coating with n layers wherein n is 3, 4, or 5 and the first layer at the air side and the n-th layer on the surface of synthetic resin characterized by that the first layer comprises silicon dioxide ($SiO_2$), and the n-th layer comprises ceric oxide ($CeO_2$). The anti-reflection coating have three, four, or five layers on the synthetic resin respectively. Each layer contributes to the reflection reducing effects of the anti-reflection coating of the invention. It is important in the invention to notice that the adhesive properties of ceric oxide with synthetic resin is excellent and the n-th layer of ceric oxide effective functions to prevent peeling of the anti-reflection coating and the first layer of silicon dioxide at the air side functions as a surface protective layer to improve the durability of the anti-reflection coating in cooperation with the n-th layer.

An anti-reflection coating of the invention is constituted with more than one, two, or three layers between the first layer and n-th layer to achieve reflection reducing effects, while the above properties of the first layer and n-th layer are maitaineded or not impaired.

First, an anti-reflection coating with three layers (n is 3) is explained hereinafter.

The anti-reflection coating with three layers is constituted of the first layer at the air side comprising silicon dioxide ($SiO_2$), the second layer comprising aluminum oxide($Al_2O_3$), the third layer on the surface of synthetic resin comprising ceric oxide ($CeO_2$).

Any synthetic resin with refractive index of $1.49 \sim 1.58$ which is applied to an optical part can be used in the invention. The examples of the resin include acrylic resin (PMMA), polycarbonate resin(PC), polystyrene resin(PS) and ultraviolet-curing resin.

Ceric oxide of the third layer has a higher refractive index of $1.92 \sim 2.10$ than that of the above resin and constitutes a good reflection reducing coating. Further the adhesion of ceric oxide with resin is satisfactory and ceric oxide does not cause age-based changes.

The second layer of aluminum dioxide is formed between the third layer of ceric oxide and the first layer of silicon dioxide. Aluminum dioxide has a refractive index ($1.50 \sim 1.62$) between those of ceric oxide and silicon dioxide, constitutes an anti-reflection coating, and improves the adhesion of the third layer of ceric oxide with the first layer of silicon dioxide. The uppermost layer of silicon dioxide of an anti-reflection coating without the second layer of aluminum dioxide is apt to peel off.

The first layer, or the uppermost surface, of silicon dioxide is prepared to make the best use of the advantages of lower refractive index(n) of silicon dioxide($1.45 \leq n \leq 1.47$) than that of the aluminum oxide of the second layer, and of the hardness of silicon dioxide. The first layer constitutes an anti-reflection coating and works as a surface protective layer.

The first, second, third layers can be prepared by metallizing so that the optical thickness of the first layer may have $0.20 \sim 0.32\lambda o$, the second layer; $0.02 \sim 0.15\lambda o$, and the third layer; $0.02 \sim 0.50\lambda o$ on the basis of a design wavelength ($\lambda o$).

Even though the third layer of ceric oxide is thin, the resulting anti-reflection coating is excellent in adhesion.

Then an anti-reflection coating with four layers (n is 4) is explained hereinafter.

The anti-reflection coating with four layers is constituted of the first layer at the air side comprising silicon dioxide ($SiO_2$), and the second layer comprising a material selected from the group consisting of zirconium oxide ($ZrO_2$), titanium dioxide ($TiO_2$), hafnium dioxide ($HfO_2$), ceric oxide ($CeO_2$), tantalum oxide ($Ta_2O_5$) and a mixture of zirconium oxide and titanium oxide, the third layer comprising aluminum oxide($Al_2O_3$) or silicon dioxide ($SiO_2$) and the fourth layer on the surface of synthetic resin comprising ceric oxide ($CeO_2$).

The same synthetic resin as aforementioned can be used.

Ceric oxide of the fourth layer has higher refractive index of $1.92 \sim 2.12$ than that of the above resin and constitutes a good anti-reflection coating. Further the adhesion of ceric oxide with resin is satisfactory and ceric oxide does not cause any age-based changes.

Even when the fourth layer of ceric oxide has a thin thickness (which means optical thickness), the adhesion of the layer with resin is excellent and reflectivity in wide range of wave length decreases.

The third layer is formed between the fourth layer and the second layer.

The third layer is constituted by a material with a refractive index ($1.45 \sim 1.62$) in the range of between the fourth layer and the second layer. Such material includes aluminum oxide or silicon dioxide. It can constitute an anti-reflection coating and and improved adhesion of the fourth layer with the second layer. Aluminum dioxide has a more effective adhesive ability.

The second layer can be constituted by zirconium oxide, titanium dioxide, hafnium dioxide, ceric oxide, tantalum oxide or a mixture of zirconium oxide and titanium oxide. The above materials can constitute the second layer with a higher refractive index of $1.92 \sim 2.10$ than those of both the third layer and the first layer between the two so that the reflection reducing effects may be improved. Further, the second layer improves adhesion of the third layer with the first layer. The preferred materials for the second layer are tantalum oxide and a mixture of zirconium oxide and titanium oxide.

The first layer, or the uppermost surface consisting of silicon dioxide is prepared to make the best of use of advantages of lower refractive index(n) of silicon dioxide($1.45 \leq n \leq 1.47$) than that of the material of the second layer, and of the hardness of silicon dioxide. The first layer constitutes an anti-reflection coating and works as a surface protective layer.

The first, second, third, fourth layers can be prepared by metallizing so that the thickness of the first layer may have $0.25 \sim 0.30\lambda o$, the second layer; $0.25 \sim 0.60\lambda o$, the third layer; $0.25\lambda\lambda$ or less, and the fourth layer; $0.25\lambda o$ or less on the basis of a design dominant wavelength($\lambda o$). Even though the fourth layer consisting of ceric oxide is thin, the resulting reflection reducing coating is excellent in adhesion.

Then, an anti-reflection coating with five layers (n is 5) is explained hereinafter.

The anti-reflection coating with five layers is constituted of the first layer at the air side comprising silicon dioxide ($SiO_2$), the second layer comprising aluminum oxide($Al_2O_3$), the third layer comprising ceric oxide ($CeO_2$), the fourth layer comprising aluminum oxide($Al_2O_3$) and the fifth layer on the surface of synthetic resin comprising ceric oxide ($CeO_2$)

The same synthetic resin as aforementioned can be used.

Ceric oxide of the fifth layer has a higher refractive index of $1.92 \sim 2.12$ than that of the above resin and constitutes a good anti-reflection coating. Further the adhesion of ceric oxide with resin is satisfactory and ceric oxide does not cause any age-based changes.

Even when the fifth layer has a thin thickness (which means optical thickness), the adhesion of the layer with resin is excellent and reflectivity in the wide visible range of wavelength(400–700 nm) descreases effectively by adjusting the fifth layer thickness between $0.05\lambda o$ ($\lambda o$; design dominant wavelength) or more and $0.20\lambda o$ or less.

The fourth layer of aluminum oxide is formed between the two high refractive index layers of the fifth layer and the third layer of ceric oxide, and improves the reflection reducing effect. Further, aluminum oxide improves the adhesion of the fifth and third layer of ceric oxide.

The ceric oxide layer of the third layer is formed between the fourth layer and the second layer of aluminum oxide. The reflection reducing effect is accomplished by a difference of refractive index.

The aluminum oxide layer of the second layer is formed between the third layer of ceric oxide and the first layer of silicon dioxide. Aluminum oxide has a medium refractive index($1.50 \sim 1.62$) between those of ceric oxide and silicon dioxide, constitutes an anti-reflection coating, and improves the adhesion of the third layer of ceric oxide and the first layer of silicon dioxide.

The first layer, or the uppermost surface consisting of silicon dioxide is prepared to make the best use of the advantages of the lower refractive index(n) of silicon dioxide($1.45 \leq n \leq 1.47$) than that of the aluminum oxide of the second layer, and of the hardness of silicon dioxide. The first layer constitutes an anti-reflection coating and works as a surface protective layer.

The first, second, third, fourth, fifth layers can be prepared by metallizing so that the thickness of the first layer may have $0.20 \sim 0.32\lambda o$, the second layer; $0 \sim 0.10\lambda o$, the third layer; $0.20 \sim 0.35\lambda o$, the fourth layer; $0.02 \sim 0.10\lambda o$, and the fifth layer; $0.05 \sim 0.20\lambda o$ on the basis of a design dominant wavelength($\lambda o$) .

Even though the fifth layer consisting of ceric oxide is thin, the resulting anti-reflection coating is excellent in adhesion.

The anti-reflection coating of the present invention can be applied effectively to anti-reflection coatings of various optical parts made of synthetic resin such as plastic lenses and combined aspherical lenses for cameras and videoprojectors etc.

This invention will now be explained with reference to examples hereunder.

EXAMPLES

Reflection reducing coatings shown in Table 1~21 were prepared on optical parts made of synthetic resin which were not subjected to heating by metallizing under $5 \times 10^{-5}$ Torr of ultimate pressure and about 0.5 nm/second of metallizing rate according to the method of an electron gun.

TABLE-1

(layer constitution 1)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.263 $\lambda_0$ |
| second layer | $ZrO_2$ | 1.95 | 0.536 $\lambda_0$ |
| third layer | $Al_2O_3$ | 1.56 | 0.142 $\lambda_0$ |
| fourth layer | $CeO_2$ | 2.00 | 0.039 $\lambda_0$ |
| outgoing medium | synthetic resin (UV curing resin) | 1.51 | |

TABLE-2

(layer constitution 2)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.264 $\lambda_0$ |
| second layer | $ZrO_2 + TiO_2$ | 2.00 | 0.539 $\lambda_0$ |
| third layer | $Al_2O_3$ | 1.56 | 0.136 $\lambda_0$ |
| fourth layer | $CeO_2$ | 2.00 | 0.046 $\lambda_0$ |
| outgoing medium | synthetic resin (UV curing resin) | 1.51 | |

TABLE-3

(layer constitution 3)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.264 $\lambda_0$ |
| second layer | $Ta_2O_5$ | 2.10 | 0.543 $\lambda_0$ |
| third layer | $Al_2O_3$ | 1.56 | 0.124 $\lambda_0$ |
| fourth layer | $CeO_2$ | 2.00 | 0.061 $\lambda_0$ |
| outgoing medium | synthetic resin (UV curing resin) | 1.51 | |

TABLE-4

(layer constitution 4)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.254 $\lambda_0$ |
| second layer | $ZrO_2$ | 1.95 | 0.282 $\lambda_0$ |
| third layer | $Al_2O_3$ | 1.56 | 0.072 $\lambda_0$ |
| fourth layer | $CeO_2$ | 2.00 | 0.097 $\lambda_0$ |
| outgoing medium | synthetic resin (UV curing resin) | 1.51 | |

TABLE-5

(layer constitution 5)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.255 $\lambda_0$ |
| second layer | $ZrO_2 + TiO_2$ | 2.00 | 0.278 $\lambda_0$ |
| third layer | $Al_2O_3$ | 1.56 | 0.061 $\lambda_0$ |
| fourth layer | $CeO_2$ | 2.00 | 0.116 $\lambda_0$ |
| outgoing medium | synthetic resin (UV curing resin) | 1.51 | |

TABLE-6

(layer constitution 6)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.253 $\lambda_0$ |
| second layer | $Ta_2O_5$ | 2.10 | 0.285 $\lambda_0$ |
| third layer | $Al_2O_3$ | 1.56 | 0.033 $\lambda_0$ |
| fourth layer | $CeO_2$ | 2.00 | 0.159 $\lambda_0$ |
| outgoing medium | synthetic resin (UV curing resin) | 1.51 | |

TABLE-7

(layer constitution 7)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.264 $\lambda_0$ |
| second layer | $ZrO_2$ | 1.95 | 0.549 $\lambda_0$ |
| third layer | $SiO_2$ | 1.47 | 0.104 $\lambda_0$ |
| fourth | $CeO_2$ | 2.00 | 0.055 $\lambda_0$ |

TABLE-7-continued (layer constitution 7)
$\lambda_0 = 510$ nm; incident angle $\theta = 0°$

| | material | refractive index (n) | optical layer thickness (nd) |
|---|---|---|---|
| layer outgoing medium | synthetic resin (UV curing resin) | 1.51 | |

TABLE-8

(layer constitution 8)
$\lambda_0 = 510$ nm; incident angle $\theta = 0°$

| | material | refractive index (d) | optical layer thickness (nd) |
|---|---|---|---|
| incident medium | air | 1.0 | |
| first layer | $SiO_2$ | 1.47 | 0.264 $\lambda_0$ |
| second layer | $Ta_2O_5$ | 2.10 | 0.552 $\lambda_0$ |
| third layer | $SiO_2$ | 1.47 | 0.097 $\lambda_0$ |
| fourth layer | $CeO_2$ | 2.00 | 0.074 $\lambda_0$ |
| outgoing medium | synthetic resin (UV curing resin) | 1.51 | |

TABLE-9

(layer constitution 9)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.256 $\lambda_0$ |
| second layer | $ZrO_2$ | 1.95 | 0.289 $\lambda_0$ |
| third layer | $SiO_2$ | 1.47 | 0.054 $\lambda_0$ |
| fourth layer | $CeO_2$ | 2.00 | 0.102 $\lambda_0$ |
| outgoing medium | synthetic resin (UV curing resin) | 1.51 | |

TABLE-10

(layer constitution 10)
$\lambda_0 = 510$ nm; incident angle $\theta = 0°$

| | material | refractive index (d) | optical layer thickness (nd) |
|---|---|---|---|
| incident medium | air | 1.0 | |
| first layer | $SiO_2$ | 1.47 | 0.263 $\lambda_0$ |
| second layer | $ZrO_2$ | 1.95 | 0.533 $\lambda_0$ |
| third layer | $Al_2O_3$ | 1.56 | 0.151 $\lambda_0$ |
| fourth layer | $CeO_2$ | 2.00 | 0.037 $\lambda_0$ |
| outgoing medium | synthetic resin (PMMA) | 1.49 | |

TABLE-11

(layer constitution 11)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.265 $\lambda_0$ |
| second layer | $ZrO_2$ | 1.95 | 0.546 $\lambda_0$ |
| third layer | $Al_2O_3$ | 1.56 | 0.118 $\lambda_0$ |
| fourth layer | $CeO_2$ | 2.00 | 0.046 $\lambda_0$ |
| outgoing medium | synthetic resin (PC) | 1.58 | |

TABLE-12

(layer constitution 12)
$\lambda_0 = 510$ nm; incident angle $\theta = 0°$

| | material | refractive index (d) | optical layer thickness (nd) |
|---|---|---|---|
| incident medium | air | 1.0 | |
| first layer | $SiO_2$ | 1.47 | 0.264 $\lambda_0$ |
| second layer | $Ta_2O_5$ | 2.10 | 0.541 $\lambda_0$ |
| third layer | $Al_2O_3$ | 1.56 | 0.130 $\lambda_0$ |
| fourth layer | $CeO_2$ | 2.00 | 0.058 $\lambda_0$ |
| outgoing medium | synthetic resin (PMMA) | 1.49 | |

TABLE-13

(layer constitution 13)
$\lambda_0 = 510$ nm; incident angle $\theta = 0°$

| | material | refractive index (n) | optical layer thickness (nd) |
|---|---|---|---|
| incident medium | air | 1.0 | |
| first layer | $SiO_2$ | 1.47 | 0.265 $\lambda_0$ |
| second layer | $Ta_2O_5$ | 2.10 | 0.550 $\lambda_0$ |
| third layer | $Al_2O_3$ | 1.56 | 0.105 $\lambda_0$ |
| fourth layer | $CeO_2$ | 2.00 | 0.071 $\lambda_0$ |
| outgoing medium | synthetic resin (PC) | 1.58 | |

TABLE-14

(layer constitution 14)
$\lambda_0 = 510$ nm; incident angle $\theta = 0°$

| | material | refractive index (d) | optical layer thickness (nd) |
|---|---|---|---|
| incident medium | air | 1.0 | |
| first layer | $SiO_2$ | 1.47 | 0.23 $\lambda_0$ |
| second layer | $Al_2O_3$ | 1.52 | 0.1 $\lambda_0$ |
| third layer | $CeO_2$ | 1.92 | 0.08 $\lambda_0$ |
| outgoing medium | synthetic resin (PMMA) | 1.49 | |

TABLE-15

(layer constitution 15)
λo = 510 nm; incident angle θ = 0°

| | material | refractive index (d) | optical layer thickness (nd) |
|---|---|---|---|
| incident medium | air | 1.0 | |
| first layer | $SiO_2$ | 1.47 | 0.28 λo |
| second layer | $Al_2O_3$ | 1.52 | 0.05 λo |
| third layer | $CeO_2$ | 1.92 | 0.08 λo |
| outgoing medium | synthetic resin (PMMA) | 1.49 | |

TABLE-16

(layer constitution 16)
λo = 780 nm; incident angle θ = 0°

| | material | refractive index (d) | optical layer thickness (nd) |
|---|---|---|---|
| incident medium | air | 1.0 | |
| first layer | $SiO_2$ | 1.47 | 0.23 λo |
| second layer | $Al_2O_3$ | 1.52 | 0.10 λo |
| third layer | $CeO_2$ | 1.92 | 0.08 λo |
| outgoing medium | synthetic resin (PMMA) | 1.49 | |

TABLE-17

(layer constitution 17)
λo = 510 nm; incident angle θ = 0°

| | material | refractive index (n) | optical layer thickness (nd) |
|---|---|---|---|
| incident medium | air | 1.0 | |
| first layer | $SiO_2$ | 1.47 | 0.240 λo |
| second layer | $Al_2O_3$ | 1.52 | 0.020 λo |
| third layer | $CeO_2$ | 1.92 | 0.268 λo |
| fourth layer | $Al_2O_3$ | 1.52 | 0.062 λo |
| fifth layer | $CeO_2$ | 1.92 | 0.114 λo |
| outgoing medium | synthetic resin (UV curing resin) | 1.51 | |

TABLE-18

(layer constitution 18)
λo = 510 nm; incident angle θ = 0°

| | material | refractive index (n) | optical layer thickness (nd) |
|---|---|---|---|
| incident medium | air | 1.0 | |
| first layer | $SiO_2$ | 1.47 | 0.237 λo |
| second layer | $Al_2O_3$ | 1.56 | 0.020 λo |
| third layer | $CeO_2$ | 1.92 | 0.276 λo |
| fourth layer | $Al_2O_3$ | 1.56 | 0.070 λo |
| fifth layer | $CeO_2$ | 1.92 | 0.107 λo |
| outgoing medium | synthetic resin (UV curing resin) | | |

TABLE-19

(layer constitution 19)
λo = 510 nm; incident angle θ = 0°

| | material | refractive index (n) | optical layer thickness (nd) |
|---|---|---|---|
| incident medium | air | 1.0 | |
| first layer | $SiO_2$ | 1.47 | 0.240 λo |
| second layer | $Al_2O_3$ | 1.56 | 0.020 λo |
| third layer | $CeO_2$ | 2.00 | 0.271 λo |
| fourth layer | $Al_2O_3$ | 1.56 | 0.062 λo |
| fifth layer | $CeO_2$ | 2.00 | 0.115 λo |
| outgoing medium | synthetic resin (UV curing resin) | 1.51 | |

TABLE-20

(layer constitution 20)
λo = 510 nm; incident angle θ = 0°

| | material | refractive index (n) | optical layer thickness (nd) |
|---|---|---|---|
| incident medium | air | 1.0 | |
| first layer | $SiO_2$ | 1.47 | 0.240 λo |
| second layer | $Al_2O_3$ | 1.56 | 0.020 λo |
| third layer | $CeO_2$ | 2.00 | 0.271 λo |
| fourth layer | $Al_2O_3$ | 1.56 | 0.062 λo |
| fifth layer | $CeO_2$ | 2.00 | 0.115 λo |
| outgoing medium | synthetic resin (PMMA) | 1.51 | |

TABLE-21

(layer constitution 21)
λo = 510 nm; incident angle θ = 0°

| | material | refractive index (n) | optical layer thickness (nd) |
|---|---|---|---|
| incident medium | air | 1.0 | |
| first layer | $SiO_2$ | 1.47 | 0.240 λo |
| second layer | $Al_2O_3$ | 1.56 | 0.020 λo |
| third layer | $CeO_2$ | 2.00 | 0.271 λo |
| fourth layer | $Al_2O_3$ | 1.56 | 0.062 λo |
| fifth layer | $CeO_2$ | 2.00 | 0.115 λo |
| outgoing medium | synthetic resin (PC) | 1.58 | |

Figure 1:
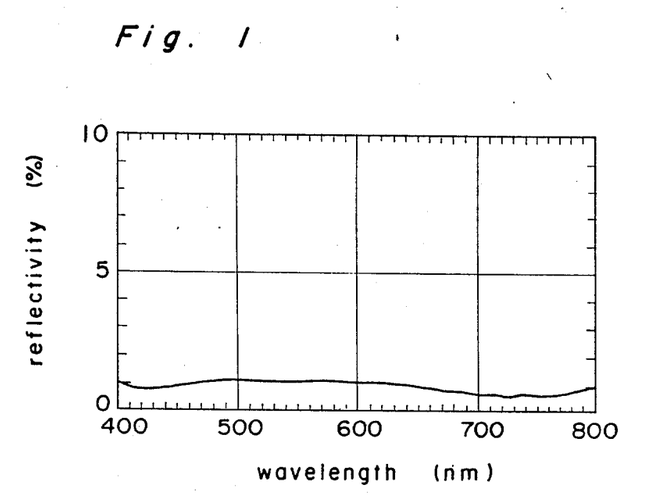
Figure 2:
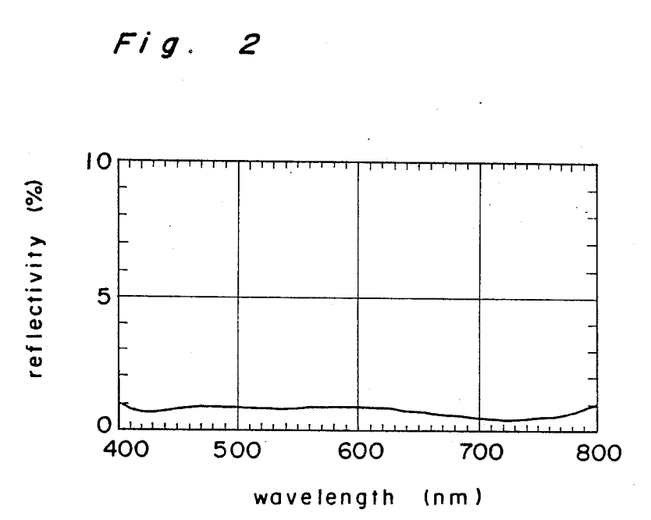
Figure 3:
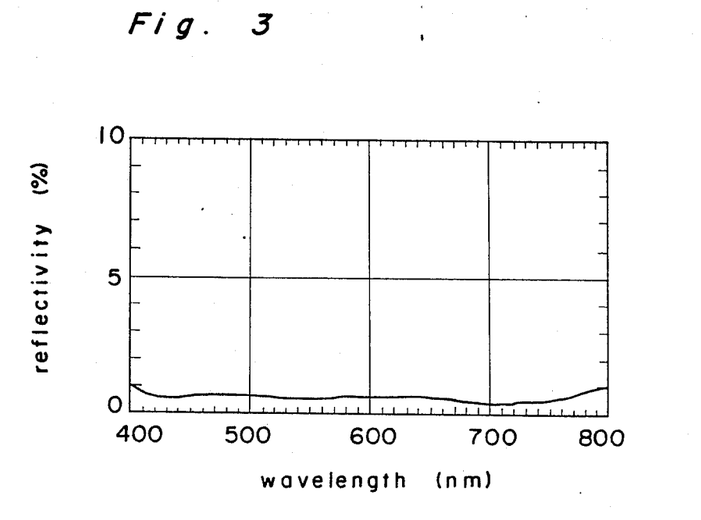
Figure 4:
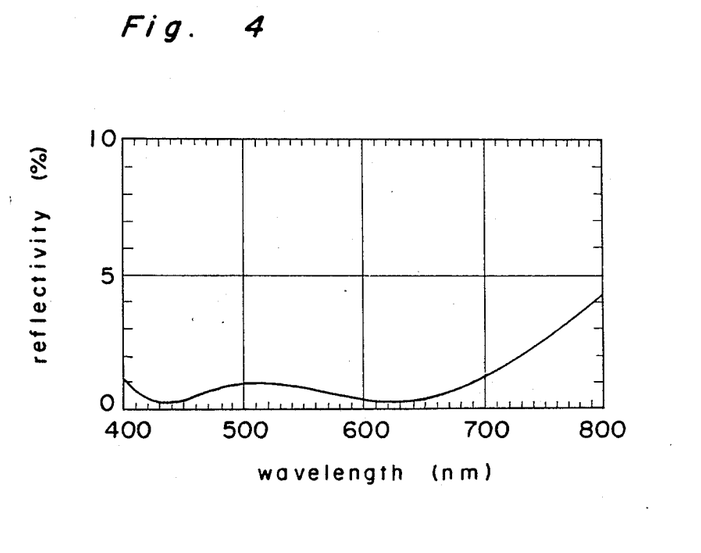
Figure 5:
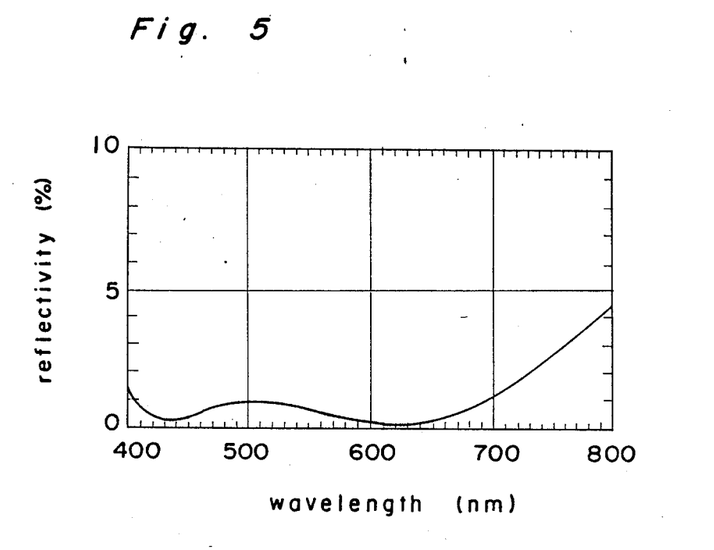
Figure 6:
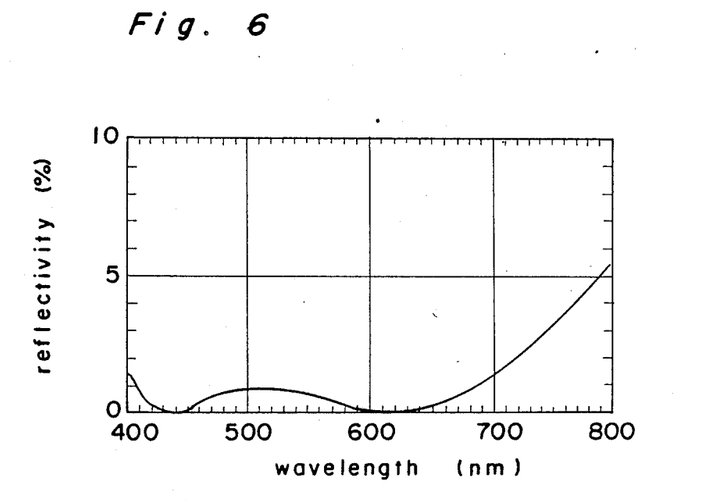
Figure 7:
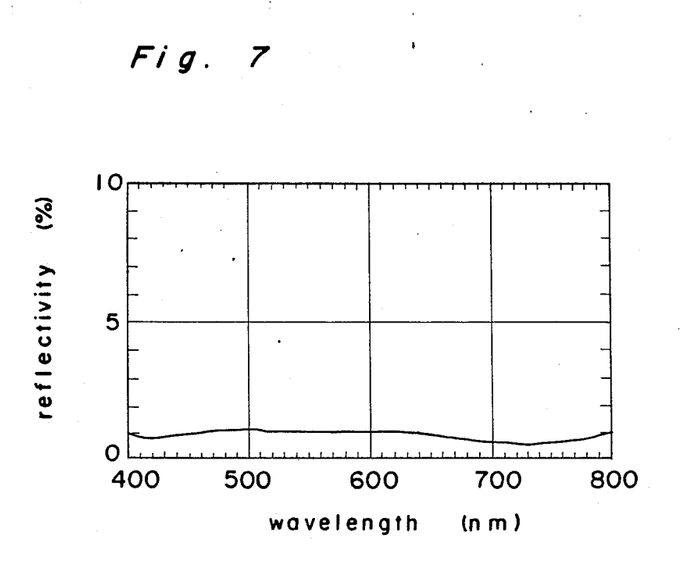
Figure 8:
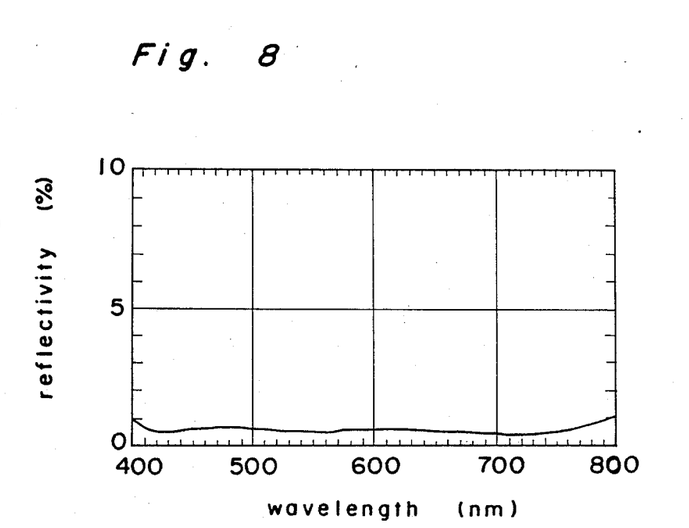
Figure 9:
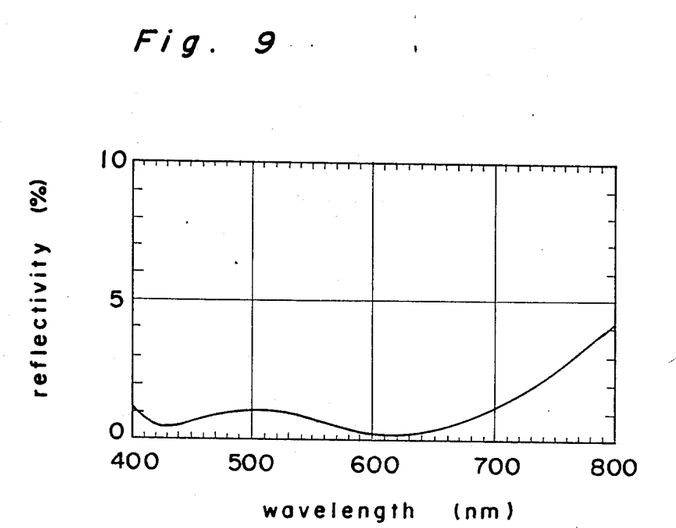
Figure 10:
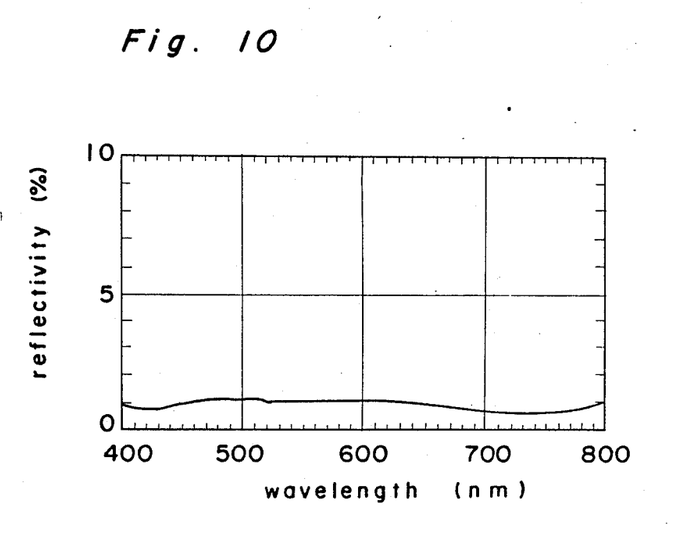
Figure 11:
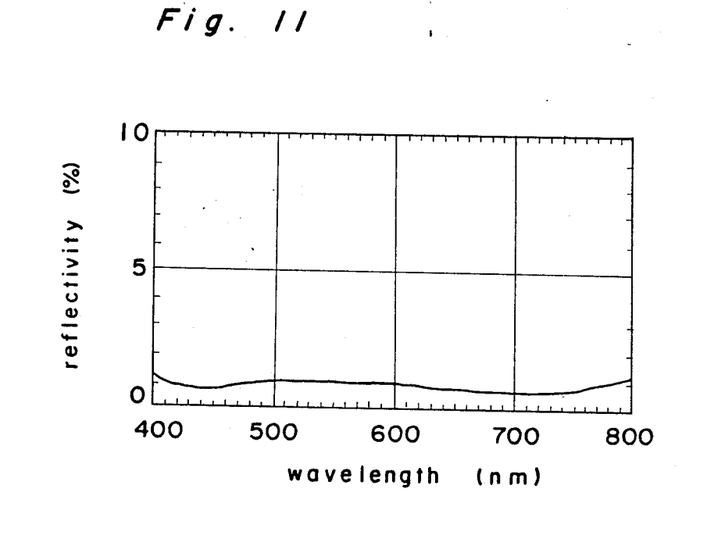
Figure 12:
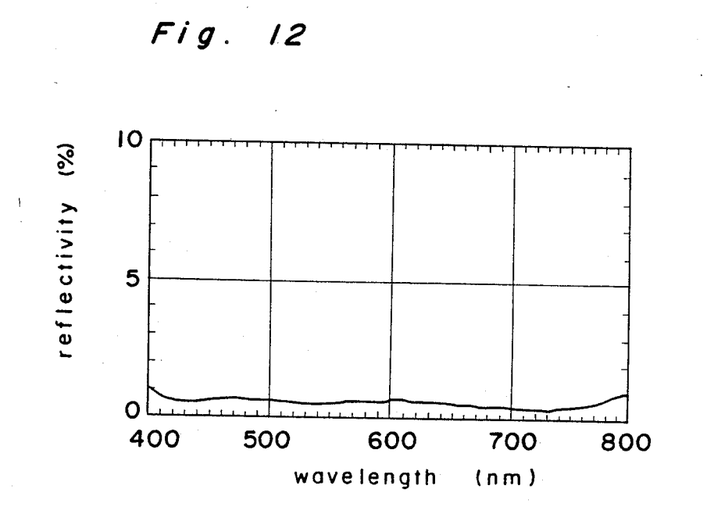
Figure 13:
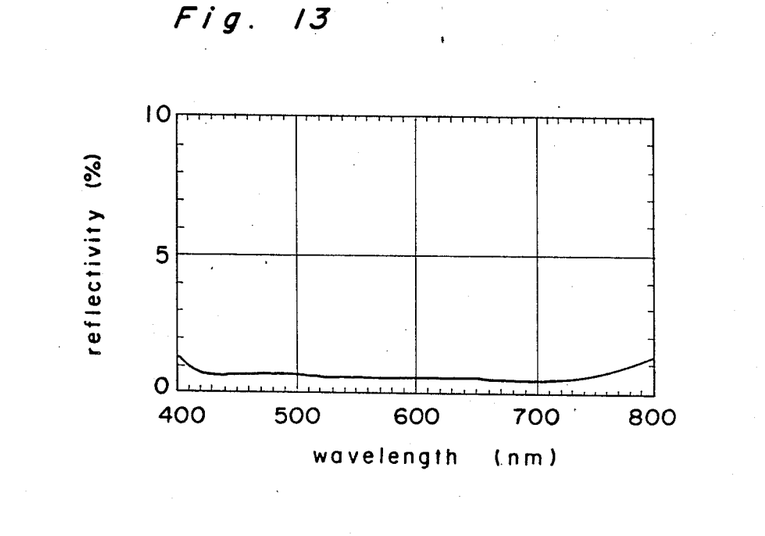
Figure 14:
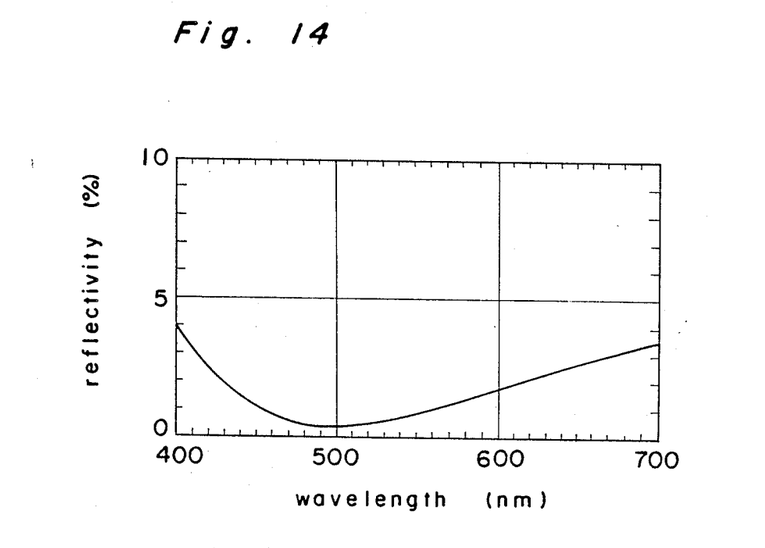
Figure 15:
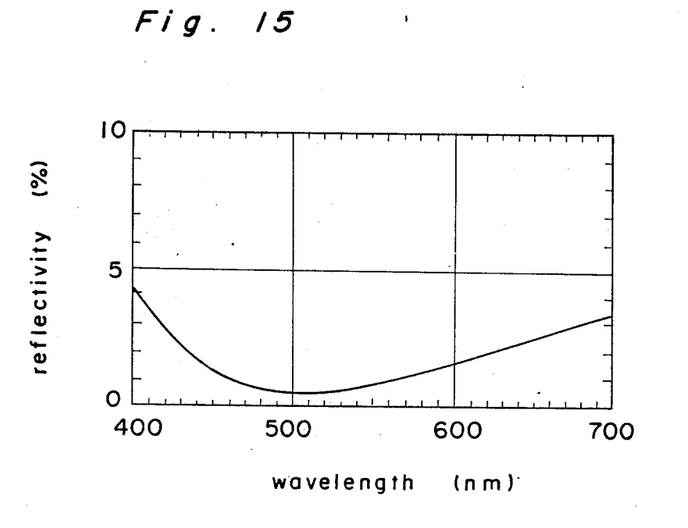
Figure 16:
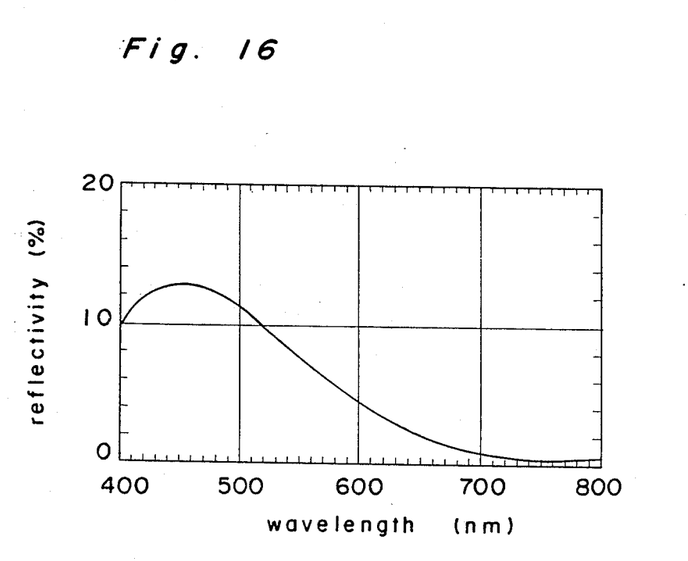
Figure 17:
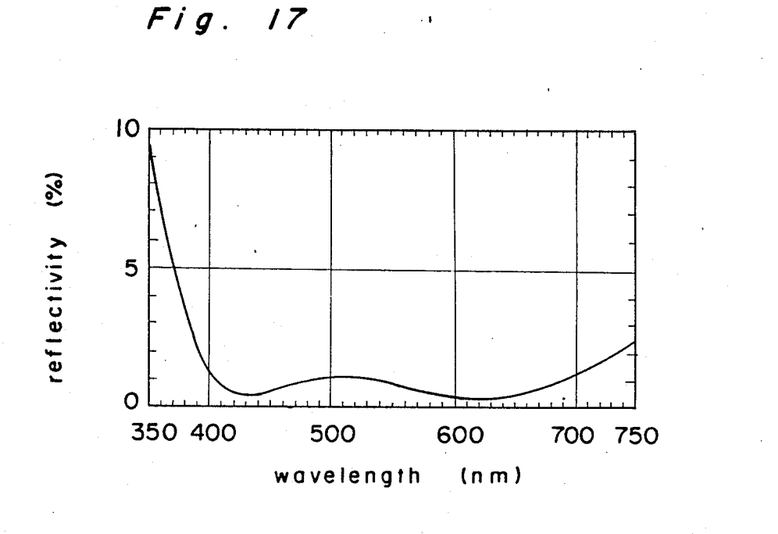
Figure 18:
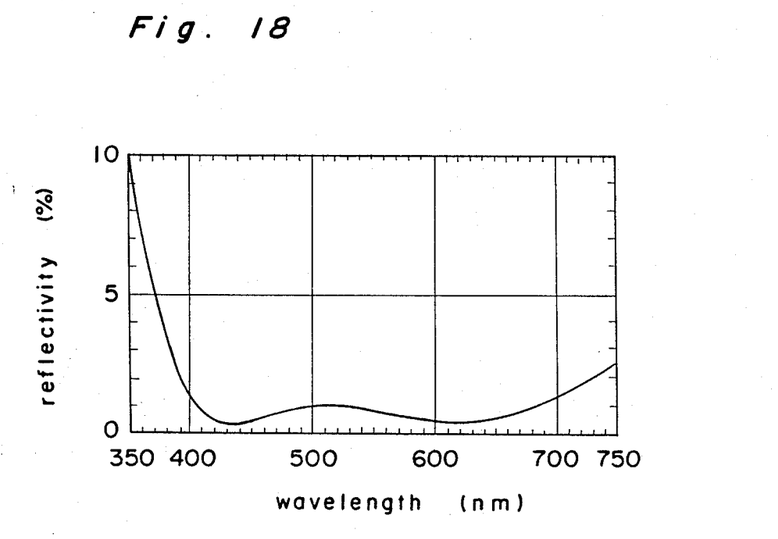
Figure 19:
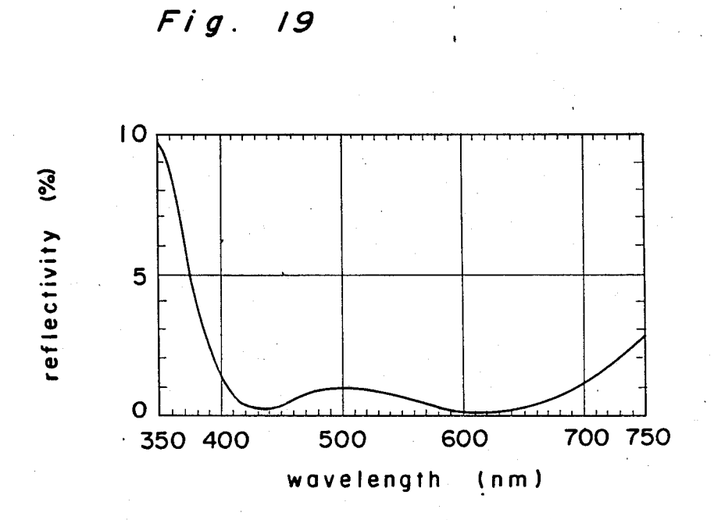
Figure 20:
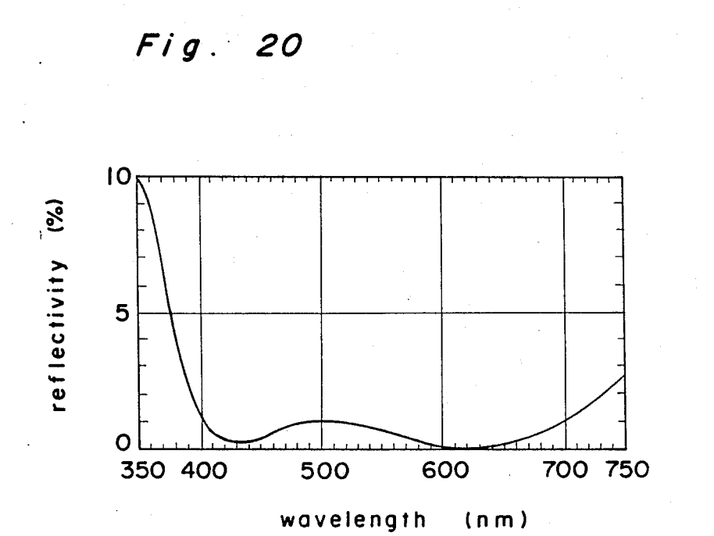
Figure 21:
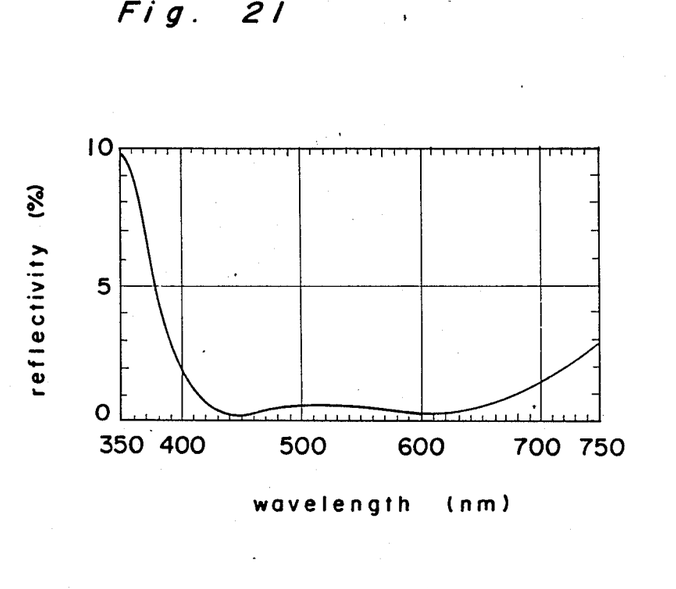

FIGS. 1~21 show reflective properties of reflection reducing coatings shown by the above layer constitutions 1~21.

The reflection reducing coatings with four layers, particulaly, have reflection reducing effects not only in the visible region (400~700 nm) but also in near infrared region of around 800 nm. Therefore, the reflection reducing coating of the invention can also be applied to an active photometry lens system which utilizes near infrared lights.

Adhesion, chemical resistance and environmental resistance were evaluated as a dependability test of the reflection reducing coatings with the layer constitution shown in the above table 1~21.

ADHESION TEST

A tape was glued to the prepared reflection reducing coating, and then the tape was taken away perpendicularly from the surface. The above procedure was repeated ten times. The surface states were observed whether the layer was peeled off and it was found that the layer had not peeled.

CHEMICAL RESISTANCE TEST

The prepared anti-reflection coatings were wiped with a cloth for lens cleaning and a paper which were wetted with solvents such as fluorinated solvent, alcohol, ether. Deterioration of the coatings were not realized.

ENVIRONMENTAL RESISTANCE TEST

Humidity resistance

The prepared anti-reflection coatings were left alone under 50° C. of temperature and 95% of relative humidity.

Deterioration of the layers were not realized.

Heat cycle test

The prepared anti-reflection coatings were left alone at $-30°$ C. for 1 hour and then at $+70°$ C. for 1 hour. The above cycle was repeated 4 times. Deterioration of the layers were not realized.

Evaluation

The prepared anti-reflection coatings comprising a ceric oxide thin layer on an optical part substrate made of synthetic resin is excellent in reflection reducing effect and does not result in the age-based change of the refractive index. And that the very good adhesion of the reflection reducing coating with the substrate is hardly subjected to peeling of layers.

Further an anti-reflection coating of the invention has reflection reducing effect in the near-infrared region.

What is claimed is:

1. An anti-reflection coating of three layers for a synthetic resin substrate having a refractive index in the approximate range of 1.49 to 1.58, comprising:
   a first layer, at the air side, of silicon dioxide;
   a second layer having an index of refraction of $n_2$;
   a third layer, adjacent the substrate, of ceric oxide, having an index of refraction of $n_3$, and
   the second layer and the third layer satisfying the following conditions, respectively:
   $1.50 \leq n_2 \leq 1.62$,
   $0.04\lambda_0 \leq n_2 d_2 \leq 0.15\lambda_0$,
   $1.92 \leq n_3 \leq 2.10$,
   $0.02\lambda_0 \leq n_3 d_3 \leq 0.50\lambda_0$,
   wherein $n_2 d_2$ and $n_3 d_3$ are the optical thickness of the second layer and the third layer, respectively, and $\lambda_0$ is the dominant design wavelength.

2. An anti-reflection coating of claim 1, which further satisfies the below conditions:
   $1.45 \leq n_1 \leq 1.47$,
   $1.92 \leq n_3 \leq 2.10$,
   $0.20\lambda_0 \leq n_1 d_1 \leq 0.32\lambda_0$,
   $0.02\lambda_0 \leq n_3 d_3 \leq 0.50\lambda_0$,
   wherein
   $n_1$: refractive index of the first layer,
   $n_3$: refractive index of the third layer,
   $n_1 d_1$: optical thickness of the first layer,
   $n_3 d_3$: optical thickness of the third layer,
   $\lambda_0$: design dominant wavelength.

3. An anti-reflection coating of four layers for a synthetic resin substrate, comprising:
   a first layer, at the air side, of silicon dioxide;
   a second layer comprising a material selected from the group consisting of zirconium oxide, titanium dioxide, hafnium dioxide, ceric oxide, tantalum oxide, and a mixture of zirconium oxide and titanium oxide;
   a third layer selected from one of aluminum oxide and silicon dioxide, and
   a fourth layer, on the surface of the synthetic resin substrate, comprising ceric oxide having an index of refraction of $n_4$, and the fourth layer satisfying the following equations:
   $1.92 \leq n_4 \leq 2.10$,
   $0 < n_4 d_4 \leq 0.25\lambda_0$
   wherein $n_4 d_4$ is an optical thickness of the fourth layer and $\lambda_0$ is a dominant design wavelength.

4. An anti-reflection coating of claim 3, which further satisfies the below conditions:
   $1.45 \leq n_1 \leq 1.47$,
   $1.92 \leq n_2 \leq 2.10$,
   $1.45 \leq n_3 \leq 1.62$,
   $1.92 \leq n_4 \leq 2.10$,
   $0.25\lambda_0 \leq n_1 d_1 \leq 0.30\lambda_0$,
   $0.25\lambda_0 \leq n_2 d_2 \leq 0.60\lambda_0$,
   $0 < n_3 d_3 \leq 0.25\lambda_0$,
   $0 < n_4 d_4 \leq 0.25\lambda_0$,
   wherein
   $n_1$: refractive index of the first layer,
   $n_2$: refractive index of the second layer,
   $n_3$: refractive index of the third layer,
   $n_4$: refractive index of the fourth layer,
   $n_1 d_1$: optical thickness of the first layer,
   $n_2 d_2$: optical thickness of the second layer,
   $n_3 d_3$: optical thickness of the third layer,
   $n_4 d_4$: optical thickness of the fourth layer,
   $\lambda_0$: design dominant wavelength.

5. An anti-reflection coating of five layers for a synthetic resin substrate, comprising:
   a first layer, at the air side, of silicon dioxide;
   a second layer of aluminum oxide;
   a third layer of ceric oxide;
   a fourth layer of aluminum oxide, and
   a fifth layer, on the surface of the synthetic resin substrate, of ceric oxide having an index of refraction of $n_5$, and the fifth layer satisfying the following equations:
   $1.92 \leq n_5 \leq 2.10$,
   $0.05\lambda_0 \leq n_5 d_5 \leq 0.20\lambda_0$,
   wherein $n_5 d_5$ is an optical thickness of the fifth layer and $\lambda_0$ is a dominant design wavelength.

* * * * *